*Alfred Knapp,*
*Hay-Fork.*
Nº 72,050. Patented Dec 10. 1867.
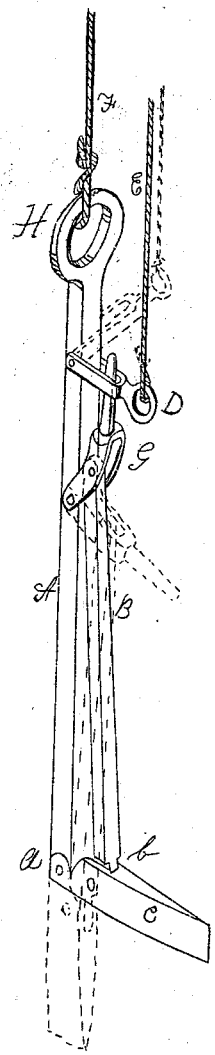
Witnesses
V. Clayton
J. G. Clayton
Alfred Knapp.
by Atty.
Jo C. Clayton

United States Patent Office.

ALFRED KNAPP, OF NORTH FAIRFIELD, OHIO.

Letters Patent No. 72,050, dated December 10, 1867.

IMPROVEMENT IN HORSE HAY-FORKS.

*The Schedule referred to in these Letters Patent and making part of the same.*

TO ALL WHOM IT MAY CONCERN:

Be it known that I, ALFRED KNAPP, of North Fairfield, in the county of Huron, and in the State of Ohio, have invented certain new and useful Improvements in "Hay-Forks;" and I do hereby declare that the following is a full, clear, and exact description thereof, reference being had to the accompanying drawings, and to the letters of reference marked thereon, in which—

Figure 1 is a side elevation, in which the hook is bent in the position required in raising the bundle of hay or straw. The red lines indicate the position of the instrument to be inserted into the bundle of hay or straw.

The nature of my invention consists of a chisel-point, for inserting the same into the hay, constructed with a joint near the chisel-end, which can be turned at or near a right angle to the stem or body of the instrument, after it has been inserted, by means of the cord for holding and lifting up the same.

To enable others skilled in the art to make and use my invention, I will proceed to describe its construction and operation.

In the construction of my invention, the body of the instrument A is made of wrought iron, with a loop at the upper end of the same, marked H, to which is attached cord F, for holding the machine in proper position. This cord may be attached to a standard fixed to the wagon, or in any other convenient way or place that may be required to use my invention. The chisel C may be made of steel or wrought iron, and is hinged to the body A in any convenient manner, as seen at $a$. B is a connecting-rod, made of iron, and is also hinged to the chisel $c$, as seen at $b$. G is brace-piece, hinged to the body A, as seen at $c$, and to the rod B, at $d$, having a projecting end, to catch or loop into loop or holder D. A cord, E, is attached to the loop-end of this holder D, for the purpose of operating the chisel C after it has been inserted into the hay. The red lines show the position of the invention when it is to be inserted into the hay.

In the operation of my invention, when I wish to insert the same, the brace-piece G is pressed down by hand, by the operator, (or it may by its own weight fall into position,) pressing it down into the hay or other material to be raised. When thus inserted to a sufficient depth, the brace-piece G is then drawn up in a line parallel to main piece A, when the holder D is pushed down over it, and it is held firmly in position until the hay is raised to the place required, when the cord E is drawn, relieving the brace-piece G, and allowing the chisel to form a straight line with the body A, thus relieving the fork of the hay. The cord F passes over a pulley, in any suitable form of arrangement, for the purpose of elevating the hay.

Having thus described my invention, what I claim as new, and desire to secure by Letters Patent, is—

The hinged chisel $c$, in combination with the main piece A, rod B, brace-piece G, and holder D, constructed substantially as described and for the purposes set forth.

In testimony that I claim the above-described invention, I have hereunto signed my name, this    day of February, 1867.

ALFRED KNAPP.

Witnesses:
 A. C. TAYLOR,
 CHAS. ANDREWS.